United States Patent
Ohashi et al.

(10) Patent No.: US 10,941,232 B2
(45) Date of Patent: Mar. 9, 2021

(54) PHOTOCURABLE RESIN COMPOSITION, INK AND COATING MATERIAL

(71) Applicant: OSAKA SODA CO., LTD., Osaka (JP)

(72) Inventors: Shinichiro Ohashi, Osaka (JP); Katsutoshi Yokoyama, Osaka (JP); Satoshi Inoue, Osaka (JP)

(73) Assignee: Osaka Soda Co., Ltd., Osaka (JP)

( * ) Notice: Subject to any disclaimer, the term of this patent is extended or adjusted under 35 U.S.C. 154(b) by 27 days.

(21) Appl. No.: 16/085,432

(22) PCT Filed: Mar. 27, 2017

(86) PCT No.: PCT/JP2017/012370
§ 371 (c)(1),
(2) Date: Sep. 14, 2018

(87) PCT Pub. No.: WO2017/170388
PCT Pub. Date: Oct. 5, 2017

(65) Prior Publication Data
US 2019/0085111 A1    Mar. 21, 2019

(30) Foreign Application Priority Data
Mar. 31, 2016 (JP) .............................. JP2016-071859

(51) Int. Cl.
| | | |
|---|---|---|
| *C08F 222/26* | (2006.01) | |
| *C08F 2/44* | (2006.01) | |
| *C09D 11/101* | (2014.01) | |
| *C09D 7/40* | (2018.01) | |
| *C08L 29/06* | (2006.01) | |
| *C08K 5/00* | (2006.01) | |
| *C08F 263/00* | (2006.01) | |
| *C08F 18/14* | (2006.01) | |
| *C09D 4/00* | (2006.01) | |
| *C09D 147/00* | (2006.01) | |
| *C08K 5/14* | (2006.01) | |
| *C08K 5/23* | (2006.01) | |
| *C08K 5/56* | (2006.01) | |
| *C08L 33/14* | (2006.01) | |
| *C09D 11/106* | (2014.01) | |
| *C09D 129/06* | (2006.01) | |
| *C08F 263/06* | (2006.01) | |

(52) U.S. Cl.
CPC .............. *C08F 222/26* (2013.01); *C08F 2/44* (2013.01); *C08F 18/14* (2013.01); *C08F 263/00* (2013.01); *C08K 5/00* (2013.01); *C08K 5/14* (2013.01); *C08K 5/23* (2013.01); *C08K 5/56* (2013.01); *C08L 29/06* (2013.01); *C08L 33/14* (2013.01); *C09D 4/00* (2013.01); *C09D 7/40* (2018.01); *C09D 11/101* (2013.01); *C09D 11/106* (2013.01); *C09D 129/06* (2013.01); *C09D 147/00* (2013.01); *C08F 263/06* (2013.01)

(58) Field of Classification Search
CPC ...... C08F 222/26; C08F 263/06; C08F 18/14; C08F 2/44; C08F 263/00; C08L 29/06; C08L 33/14; C08K 5/00; C08K 5/14; C08K 5/23; C08K 5/56; C09D 4/00; C09D 147/00; C09D 11/106; C09D 129/06; C09D 7/40; C09D 11/101
See application file for complete search history.

(56) References Cited

U.S. PATENT DOCUMENTS

| | | |
|---|---|---|
| 2006/0117993 A1 | 6/2006 | Carlini et al. |
| 2009/0324922 A1 | 12/2009 | Kadowaki et al. |
| 2011/0195256 A1 | 8/2011 | Morikawa et al. |
| 2012/0123014 A1* | 5/2012 | Chretien ................ G03G 15/20 522/182 |

FOREIGN PATENT DOCUMENTS

| | | |
|---|---|---|
| CN | 101279913 | 10/2008 |
| CN | 101283061 | 10/2008 |

(Continued)

OTHER PUBLICATIONS

Ishii, et al., "Studies on Resins of UV Curable Lithographic Inks", Journal of Photopolymer Science and Technology, Jun. 22, 1989, vol. 2, No. 2, pp. 211-216—for a concise explanation of relevance, please see p. 7 of the Written Opinion of the International Searching Authority issued for PCT/JP2017/012370.

(Continued)

*Primary Examiner* — Sanza L. McClendon
(74) *Attorney, Agent, or Firm* — Hamre, Schumann, Mueller & Larson, P.C.

(57) ABSTRACT

The present invention aims to provide a photocurable resin composition capable of constituting a composition having high printability. The present invention relates to a photocurable resin composition containing (A) an allylic polymer produced by polymerization of an allylic compound represented by the following formula (I), and (B) a gelling agent,

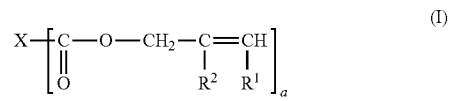

wherein $R^1$ and $R^2$ each represent H or $CH_3$; X represents an a-valent group having an unsubstituted saturated or partially unsaturated four- to eight-membered cyclic structure; and a represents 2 or 3.

7 Claims, No Drawings

(56) References Cited

FOREIGN PATENT DOCUMENTS

| | | |
|---|---|---|
| CN | 101495410 | 7/2009 |
| CN | 102137901 | 7/2011 |
| JP | 1-131223 | 5/1989 |
| JP | 5-320617 | 12/1993 |
| JP | 10-025441 | 1/1998 |
| JP | 2001-181284 | 7/2001 |
| JP | 2001-233949 | 8/2001 |
| JP | 2006-016509 | 1/2006 |
| JP | 2007-056187 | 3/2007 |
| JP | 2010-260896 | 11/2010 |
| JP | 2012-046612 | 3/2012 |
| JP | 2012-107237 | 6/2012 |
| JP | 2012-116868 | 6/2012 |
| JP | 2013-091715 | 5/2013 |
| JP | 2013-124218 | 6/2013 |
| JP | 2014-111791 | 6/2014 |
| WO | 2007/026366 | 3/2007 |

OTHER PUBLICATIONS

Written Opinion of the International Searching Authority issued for PCT/JP2017/012370, dated Oct. 11, 2018, 9 pages.
Xiao, et al., "Electron beam-curable coating materials and application thereof" Tianjin University Press, Published Dec. 1, 2014, p. 97.

* cited by examiner

PHOTOCURABLE RESIN COMPOSITION, INK AND COATING MATERIAL

TECHNICAL FIELD

The present invention relates to a photocurable resin composition containing (A) an allylic polymer and (B) a gelling agent and also relates to an ink and a coating material including the resin composition. Specifically, the present invention relates to a photocurable resin composition having high printability.

BACKGROUND ART

Various resin compositions that can be cured by light (e.g. ultraviolet rays) have been used in inks, coating materials, adhesives, photoresists, and other similar applications. For example, UV curable printing inks are highly valued because, e.g., they have a high cure rate so that they can be cured in a short time; they are environmentally friendly due to no use of solvents; and they can save resources and energy. Therefore, they are increasingly widely used in practice.

Among such resin compositions, those containing diallyl phthalate resins derived from diallyl phthalates (diallyl orthophthalate, diallyl isophthalate, diallyl terephthalate) are used as UV offset inks for paper.

Patent Literature 1 discloses that a gel varnish for active energy ray-curable printing inks obtained by heating a mixture containing A) an aluminum alcoholate or aluminum chelate compound, B) a diallyl phthalate prepolymer, and C) an active energy ray-curable liquid compound compatible with B) is excellent in workability in printing machines. However, the gel varnish has room for improvement in printability.

CITATION LIST

Patent Literature

Patent Literature 1: JP 2013-091715 A

SUMMARY OF INVENTION

Technical Problem

The present invention aims to provide a photocurable resin composition capable of constituting a composition having good printability.

Solution to Problem

As a result of extensive studies, the present inventors have found that a photocurable resin composition containing (A) an allylic polymer produced by polymerization of an allylic compound having a specific structure, and (B) a gelling agent can constitute a composition having good printability (fluidity, printing responsiveness), thereby achieving the present invention.

Specifically, the photocurable resin composition of the present invention contains (A) an allylic polymer and (B) a gelling agent, the allylic polymer (A) being produced by polymerization of an allylic compound represented by the following formula (I):

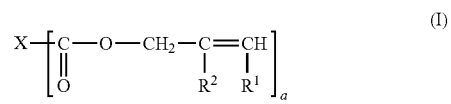

wherein $R^1$ and $R^2$ each represent H or $CH_3$; X represents an a-valent group having an unsubstituted saturated or partially unsaturated four- to eight-membered cyclic structure; and a represents 2 or 3.

A photocurable resin composition containing (A) an allylic polymer produced by polymerization of an allylic compound of formula (I) and (B) a gelling agent has high printability.

In the photocurable resin composition of the present invention, the X in formula (I) preferably has any of the following cyclic structures:

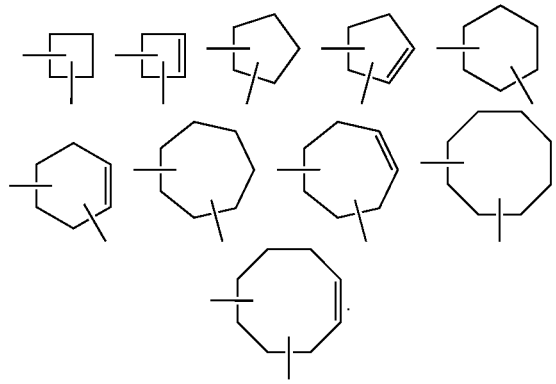

The photocurable resin composition of the present invention preferably further contains (C) an ethylenically unsaturated compound.

The incorporation of an ethylenically unsaturated compound (C) improves the drying properties of the photocurable resin composition and the film strength of the cured product formed therefrom, and can also adjust the viscosity to a level appropriate for printing, thus providing excellent coating workability to the composition.

The photocurable resin composition of the present invention preferably further contains a photopolymerization initiator. The composition containing a photopolymerization initiator can be smoothly polymerized by exposure to light, so that a higher molecular weight polymer can be produced in a short time.

The ink of the present invention includes the photocurable resin composition of the present invention.

This ink has high printability.

The coating material of the present invention includes the photocurable resin composition of the present invention.

The coating material of the present invention is preferably an overprint varnish.

Advantageous Effects of Invention

The present invention provides a photocurable resin composition which has high printability (fluidity, printing responsiveness) when it is used as a component of inks, coating materials, adhesives, or photoresists.

DESCRIPTION OF EMBODIMENTS

The photocurable resin composition of the present invention, which contains (A) an allylic polymer produced by polymerization of an allylic compound having a specific structure, and (B) a gelling agent, has a lower storage modulus at the low frequency range (around 0.01 to 0.1 Hz) resulting in good fluidity, and/or exhibits a higher storage modulus at the high frequency range (around 10 to 100 Hz) resulting in improved response speed in high-speed printing and good printing responsiveness.

In the present invention, the combined use of an allylic polymer (A) and a gelling agent (B) thus provides good fluidity and/or printing responsiveness, and therefore the photocurable resin composition has high printability and is suitable as an ink or coating material.

Moreover, although fluidity and printing responsiveness are generally opposing properties, a photocurable resin composition combining an allylic polymer (A) and an aluminum complex compound as a gelling agent (B) achieves both fluidity and printing responsiveness, and thus has higher printability and is more suitable as an ink or coating material.

It is a surprising finding that the combined use of an allylic polymer (A) and a gelling agent (B) can reduce storage modulus at the low frequency range (around 0.01 to 0.1 Hz).

It can be considered that the incorporation of the allylic polymer (A) together with the gelling agent (B) results in formation of pseudo-crosslinks which increase storage modulus at the high frequency range, thereby enhancing response speed so that good printing responsiveness can be obtained. On the other hand, although the reason that the storage modulus at the low frequency range can be reduced is not clear, it is probably due to the structure of the cyclic structure X of the allylic polymer (A).

Moreover, when water (for example, dampening water) is used in printing (particularly offset printing), water ends in being mingled in an ink; in contrast, the photocurable resin composition of the present invention, both in the absence and presence of water, has a lower storage modulus at the low frequency range resulting in good fluidity, and/or exhibits a higher storage modulus at the high frequency range resulting in improved response speed in high-speed printing and good printing responsiveness.

Further, it is known that when diallyl phthalate resins are used in offset ink applications, the inks show insufficient adhesion to plastic substrates. Since various plastic products (e.g. polyethylene terephthalate (PET), polypropylene (PP)) are on the market these days, there is a need to improve adhesion to plastic substrates with which diallyl phthalate resins have problems.

By contrast, the photocurable resin composition of the present invention is excellent in adhesion to plastic substrates, particularly to PP (polypropylene) resins. Further, the combination of the allylic polymer (A) and the gelling agent (B) may be combined with another resin component to constitute a composition having good compatibility. Hence, the photocurable resin composition of the present invention is suitable as a component of inks or coating materials for PP resins, to which it is difficult for conventional compositions containing diallyl phthalate resins to exhibit high adhesion.

Therefore, the ink of the present invention is suitable as an ink for printing on plastic substrates, particularly on PP resin substrates such as sheets and films.

Moreover, the coating material of the present invention is suitable as a coating material for painting on plastic substrates, particularly on PP resin substrates such as sheets and films.

The present invention is described in detail below.

(A) Allylic Polymer

The photocurable resin composition of the present invention contains (A) an allylic polymer produced by polymerization of an allylic compound represented by the following formula (I):

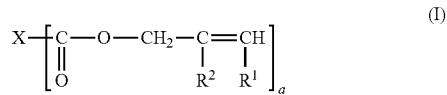

wherein $R^1$ and $R^2$ each represent H or $CH_3$; X represents an a-valent group having an unsubstituted saturated or partially unsaturated four- to eight-membered cyclic structure; and a represents 2 or 3.

Preferred examples of X in formula (I) include those having the following cyclic structures:

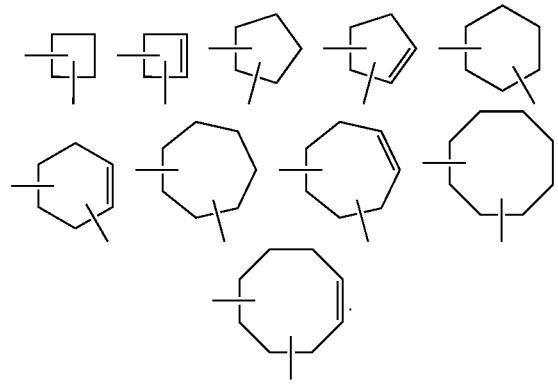

More preferred examples of X in formula (I) include those having the following cyclic structures:

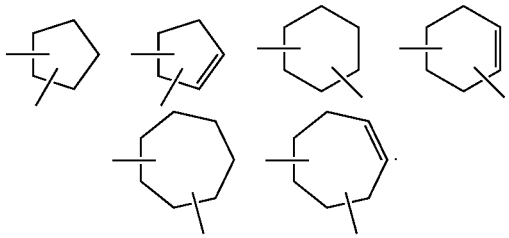

Even more preferred examples of X in formula (I) include those having the following cyclic structures:

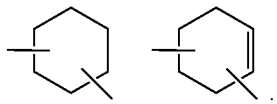

The X may be of various types and may have a cyclic structure other than those mentioned above. When X has a partially unsaturated cyclic structure, the number of double bonds in the cyclic structure is not limited to one, and may be two or more. However, X does not have an aromatic six-membered cyclic structure.

The X may be intramolecularly crosslinked. Examples of the intramolecularly crosslinked X include adamantane, norbornene, and norbornane.

Since X is an a-valent group where a is 2 or 3, X is a bivalent or trivalent group. A number "a (2 or 3)" of allyl ester groups [—CO—CH$_2$—CR$^2$=CHR$^1$] shown in formula (I) are bound to the cyclic structure of X.

Any combination of the positions of the allyl ester groups [—CO—CH$_2$—CR$^2$=CHR$^1$] substituted on the ring of X may be used. The allylic compound may be a mixture of compounds that differ in the combination of substitution positions. Particularly when two allyl ester groups are bound to a six-membered X, the two allyl ester groups may be in the ortho, meta, or para orientation, preferably in the ortho or para orientation.

Specific examples of the allylic compound of formula (I) include diallyl 1,2-cyclohexanedicarboxylate, diallyl 1,3-cyclohexanedicarboxylate, diallyl 1,4-cyclohexanedicarboxylate, diallyl 4-cyclohexene-1,2-dicarboxylate, and diallyl 2-cyclohexene-1,2-dicarboxylate. Preferred among these are diallyl 1,2-cyclohexanedicarboxylate, diallyl 4-cyclohexene-1,2-dicarboxylate, and diallyl 1,4-cyclohexanedicarboxylate, with diallyl 1,2-cyclohexanedicarboxylate being more preferred. An allylic polymer (A) produced by polymerization of at least one selected from the group consisting of the aforementioned allylic compounds may be used in the photocurable resin composition. Moreover, copolymers produced by copolymerization of the allylic compound of formula (I) and other polymerizable compounds may be used in the photocurable resin composition. Examples of such copolymerizable compounds include 3-methyl-hexahydro-1,2-diallyl phthalate, 4-methyl-hexahydro-1,2-diallyl phthalate, 3-methyl-1,2,3,6-tetrahydro-1,2-diallyl phthalate, and 4-methyl-1,2,3,6-tetrahydro-1,2-diallyl phthalate.

The specific exemplary allylic compounds of formula (I) may be produced, for example, by an esterification reaction between cyclohexanedicarboxylic acid or cyclohexanedicarboxylic anhydride and allyl alcohol or allyl chloride, or an esterification reaction between cyclohexenedicarboxylic acid or cyclohexenedicarboxylic anhydride and allyl alcohol or allyl chloride.

Commercial products of the specific exemplary allylic compounds of formula (I) may also be used.

The allylic compound of formula (I) may be polymerized by any method, including usual polymerization reactions. An appropriate polymerization initiator, if needed, may be added in such a polymerization reaction. The use of the polymerization initiator allows for production of a higher molecular weight polymer in a short time.

Examples of polymerization initiators that may be used in the polymerization reaction of the allylic compound include azo initiators such as azobisisobutyronitrile and dimethyl 2,2'-azobisisobutyrate; peroxide initiators such as ketone peroxides, peroxy ketals, hydroperoxides, dialkyl peroxides, diacyl peroxides, peroxy dicarbonates, peroxy esters, and benzoyl peroxide; and photopolymerization initiators, including: acetophenone initiators such as 2-methyl-1-[4-(methylthio)phenyl]-2-morpholinopropan-1-one and 1-hydroxycyclohexyl phenyl ketone; benzoin initiators such as benzoin and benzoin ethyl ether; benzophenone initiators such as benzophenone; phosphorus initiators such as acylphosphine oxide; sulfur initiators such as thioxanthone; and benzil initiators such as benzil and 9,10-phenanthrenequinone.

The amount of the polymerization initiator per 100 parts by weight of the allylic compound of formula (I) as a monomer is preferably 5.0 parts by weight or less, more preferably 3.0 parts by weight or less. Moreover, the amount is even more preferably 0.001 to 3.0 parts by weight.

The reaction temperature during the polymerization is preferably 60 to 240° C., e.g. 80 to 220° C. The reaction time is preferably 0.1 to 100 hours, e.g. 1 to 30 hours.

An allylic polymer (A) having a monomer unit based on the allylic compound of formula (I) may be produced by polymerizing the allylic compound of formula (I) as described above or by other methods.

The amount of the monomer unit based on the allylic compound of formula (I), based on 100% by weight of the allylic polymer (A), is preferably 20% by weight or more, more preferably 50% by weight or more, even more preferably 80% by weight or more, particularly preferably 98% by weight or more, and may be 100% by weight.

The allylic polymer (A) preferably has a weight average molecular weight of 300,000 or less, more preferably 200,000 or less. Moreover, the weight average molecular weight is even more preferably 2,000 to 150,000, particularly preferably 5,000 to 140,000.

The amount of the allylic polymer (A) in the photocurable resin composition of the present invention is preferably 1% to 60% by weight, more preferably 2% to 55% by weight, even more preferably 5% to 50% by weight of the total amount of the photocurable resin composition. When a gelling agent (B) and an ethylenically unsaturated compound (C), which will be described later, are added to the allylic polymer (A) within the range indicated above, they can be maintained sufficiently soluble so that the resulting composition has excellent compatibility, and the advantageous effects of the present invention can be more suitably achieved.

(B) Gelling Agent

In the present invention, the gelling agent (B) to be used in the photocurable resin composition containing the allylic polymer (A) is not particularly limited as long as it can be used together with the allylic polymer (A) to form pseudo-crosslinks. Examples of the gelling agent (B) include aluminum complex compounds, including, for example, cyclic aluminum compounds such as cyclic aluminum oxide octoate (Algomaer 800 available from Kawaken Fine Chemicals Co., Ltd.) and cyclic aluminum oxide stearate (Algomaer 1000S available from Kawaken Fine Chemicals Co., Ltd.), aluminum alkoxides such as aluminum ethoxide, aluminum isopropoxide (AIPD available from Kawaken Fine Chemicals Co., Ltd.), aluminum sec-butoxide (ASPD available from Kawaken Fine Chemicals Co., Ltd.), and aluminum diisopropoxide mono-sec-butoxide (AMD available from Kawaken Fine Chemicals Co., Ltd.), aluminum alkyl acetates such as aluminum-di-n-butoxide-ethylacetoacetate (Chelope-Al-EB2 available from Hope Chemical Co., Ltd.), aluminum-di-iso-butoxide-methylacetoacetate (Chelope-Al-MB12 available from Hope Chemical Co., Ltd.), aluminum-di-iso-butoxide-ethylacetoacetate (Chelope-Al-EB102 available from Hope Chemical Co., Ltd.), aluminum-di-iso-butoxide-ethylacetoacetate (Chelope-Al-EB2 available from Hope Chemical Co., Ltd.), aluminum-di-iso-propoxide-ethylacetoacetate (Chelope-Al-EP12 available from Hope Chemical Co., Ltd., ALCH available from Kawaken Fine Chemicals Co., Ltd.), aluminum-tris(acetylacetonate) (ALCH-TR available from Kawaken Fine Chemicals Co., Ltd.), aluminum-tris(acetylacetonate) (Aluminum Chelate A available from Kawaken Fine Chemicals Co., Ltd.), aluminum-bis(ethylacetylacetonate)-monoacetylacetonate (Aluminum Chelate D available from Kawaken Fine Chemicals Co., Ltd.), Aluminum Chelate M (available from Kawaken Fine Chemicals Co., Ltd.), Aluminum Chelate NB-15 (available from Hope Chemical Co., Ltd.), Chelope S (available from Hope Chemical Co., Ltd.), Chelope ACS-2 (available from Hope Chemical Co., Ltd.), Liquid Oliepe AOO (available from Hope Chemical Co., Ltd.), and Liquid Oliepe AOS (available from Hope Chemical Co., Ltd.). Other examples include aluminum soaps such as aluminum stearate (available from NOF Corp.), aluminum oleate, aluminum naphthonate, aluminum urate, and aluminum acetylacetonate.

Examples of other gelling agents (B) include cyclic dipeptides, bisamides having the ability to gelate organic liquids such as ethylenebis(12-hydroxyoctadecanoic acid) amide, and powdery aluminum-magnesium compounds such as Al—Mg-hydroxycaprylate, Al—Mg-hydroxymyristate, Al—Mg-hydroxypalmitate, and Al—Mg-hydroxybehenate. Examples further include AIP, ASB, AIE-M, ASE-M, GAO, OAO-EF, OAO-HT, Cyco-Gel, Ketalin, Ketalin-II, Ketalin-III, TRI-HLP-49, P-95, KHD, ATC-30, OASMS, OAS/607, ALAC, and AO-L47 (all available from Chattem Chemicals, Inc). Examples further include organotitanates such as tetraisopropyl titanate, tetra-n-butyl titanate, tetrabutoxytitanium, titanium acetylacetonate, titanium octylene glycolate, titanium lactate, and titanium lactate ethyl ester. Examples also include organozirconiums, including, for example, zirconium alkoxides such as zirconium-tetrabutoxide, zirconium-tetrapropoxide, acetylacetone zirconium butoxide, and ethyl acetoacetate zirconium butoxide, and zirconium complex compounds such as zirconium tetraacetylacetonate, zirconium tributoxymonoacetylacetonate, zirconium dibutoxydiacetylacetonate, zirconium monobutoxytriacetylacetonate, zirconium ethylacetoacetate, zirconyl chloride compounds, and zirconium lactate ammonium salt.

Among the gelling agents (B), preferred are aluminum complex compounds and organozirconiums, with aluminum alkyl acetates and organozirconiums being preferred, with aluminum-di-iso-propoxide-ethylacetoacetate, aluminum-tris(acetylacetonate), zirconium-tetrabutoxide, zirconium tetraacetylacetonate, and acetylacetone zirconium butoxide being more preferred.

The amount of the gelling agent (B) contained in the photocurable resin composition is preferably 0.1 to 10 parts by weight, more preferably 0.5 to 5 parts by weight, particularly preferably 1 to 3 parts by weight, per 100 parts by weight of the allylic polymer (A) of the photocurable resin composition. When the amount is within the above-indicated range, the advantageous effects of the present invention can be more suitably achieved. Moreover, sufficient adhesion to plastic substrates can be obtained, and the allylic polymer (A) and the gelling agent (B) can be maintained sufficiently soluble so that the resulting composition has excellent compatibility. Further, even when an ethylenically unsaturated compound (C) is added, they can be maintained sufficiently soluble.

(C) Ethylenically Unsaturated Compound

The photocurable resin composition of the present invention preferably contains (C) an ethylenically unsaturated compound that can be cured by exposure to light. The ethylenically unsaturated compound (C) preferably has 1 to 20, more preferably 1 to 10, even more preferably 2 to 6 carbon-carbon double bonds. The ethylenically unsaturated compound (C) may be, for example, a (meth)acrylic acid ester compound, a (meth)allyl compound, or a vinyl compound. Also, the ethylenically unsaturated compound may be a mixture of two or more compounds.

Examples of the (meth)acrylic acid ester compound include (meth)acrylic acid ester compounds of alcohols such as pentaerythritol, dipentaerythritol, trimethylolpropane, ditrimethylolpropane, neopentyl glycol, 1,6-hexanediol, glycerol, polyethylene glycol, or polypropylene glycol, and alkylene oxide (e.g. ethylene oxide, propylene oxide) adducts of these (meth)acrylic acid ester compounds; (meth)acrylic acid ester compounds of alkylene oxide (e.g. ethylene oxide, propylene oxide) adducts of bisphenols such as bisphenol A or bisphenol F; (meth)acrylic acid ester compounds such as epoxy (meth)acrylate, urethane (meth)acrylate, and alkyd (meth)acrylate; and (meth)acrylic acid ester compounds such as epoxidized soybean oil acrylate. Preferred are (meth)acrylic acid ester compounds of alcohols such as pentaerythritol, dipentaerythritol, trimethylolpropane, ditrimethylolpropane, neopentyl glycol, 1,6-hexanediol, glycerol, polyethylene glycol, or polypropylene glycol, and alkylene oxide (e.g. ethylene oxide, propylene oxide) adducts of these (meth)acrylic acid ester compounds. More preferred are (meth)acrylic acid ester compounds of alcohols such as pentaerythritol, dipentaerythritol, trimethylolpropane, or ditrimethylolpropane, and alkylene oxide (e.g. ethylene oxide, propylene oxide) adducts of these (meth)acrylic acid ester compounds.

Examples of the (meth)allyl compound include di(meth)allyl phthalate and tri(meth)allyl isocyanurate.

Examples of the vinyl compound include styrene, divinylbenzene, N-vinylpyrrolidone, and vinyl acetate.

In particular, in view of compatibility with the allylic polymer (A) and curability in photo-curing, ditrimethylolpropane tetraacrylate, trimethylolpropane triacrylate, and dipentaerythritol hexaacrylate are preferred, with ditrimethylolpropane tetraacrylate being more preferred.

The amount of the ethylenically unsaturated compound (C) contained in the photocurable resin composition of the present invention is preferably 50 to 1000 parts by weight, more preferably 50 to 400 parts by weight, even more preferably 50 to 300 parts by weight, per 100 parts by weight of the allylic polymer (A) in the photocurable resin composition.

Moreover, the amount of the ethylenically unsaturated compound (C) contained in the photocurable resin composition is preferably such that the viscosity of the photocurable resin composition falls within the range of 100 to 500 Pa·s (at 25° C.)

Other Additives

The photocurable resin composition of the present invention may contain a polymerization initiator, and in particular it preferably contains a photopolymerization initiator. Examples of photopolymerization initiators that may be contained in the photocurable resin composition include acetophenone initiators such as 2-methyl-1-[4-(methylthio)phenyl]-2-morpholinopropan-1-one and 1-hydroxycyclohexyl phenyl ketone; benzoin initiators such as benzoin and benzoin ethyl ether; benzophenone initiators such as benzophenone; phosphorus initiators such as acylphosphine oxide; sulfur initiators such as thioxanthone; and benzil initiators such as benzil and 9,10-phenanthrenequinone.

The amount of the photopolymerization initiator contained in the photocurable resin composition is preferably in the range of 0.1% to 15% by weight, more preferably 0.5% to 12% by weight, even more preferably 1% to 10% by weight of the total photocurable resin composition.

A photoinitiation aid (e.g. an amine photoinitiation aid such as triethanolamine) may be used in combination in the photocurable resin composition.

The amount of the photoinitiation aid is preferably in the range of 0.1% to 5% by weight, more preferably 0.5% to 3% by weight of the total photocurable resin composition.

The photocurable resin composition of the present invention may contain various additives depending on the purpose, and examples of such additives include stabilizers (e.g. polymerization inhibitors such as hydroquinone and methoquinone), coloring agents such as pigments (e.g. cyanine blue, disazo yellow, carmine 6b, lake red C, carbon black, titanium white), fillers, and viscosity modifiers (e.g. waxes). The amount of the stabilizer contained in the photocurable resin composition is preferably in the range of 0.01% to 2% by weight, more preferably 0.1% to 1% by weight of the total photocurable resin composition.

The amount of the coloring agent is preferably in the range of 1% to 50% by weight, more preferably 1% to 45% by weight of the total photocurable resin composition.

The photocurable resin composition of the present invention containing the gelling agent (B) preferably has a storage modulus at 0.01 Hz (low frequency range) of 70% or less, more preferably 50% or less, even more preferably 40% or less, relative to that of the photocurable resin composition containing no gelling agent (B). In such cases, better fluidity can be attained.

Moreover, the photocurable resin composition of the present invention containing the gelling agent (B) preferably has a storage modulus at 10 Hz (high frequency range) of 120% or more, more preferably 150% or more, relative to that of the photocurable resin composition containing no gelling agent (B). In such cases, better printing responsiveness can be attained.

The storage modulus is measured as described later in EXAMPLES.

The photocurable resin composition of the present invention may be prepared by mixing an allylic polymer (A) with a gelling agent (B) and optionally with an ethylenically unsaturated compound (C) as well as a photopolymerization initiator, a photoinitiation aid, and additives (e.g. a stabilizer, a pigment). The photocurable resin composition of the present invention is cured by exposure to light. The light used in the curing is typically ultraviolet rays.

The curing reaction of the photocurable resin composition may be carried out with any curing apparatus under any curing condition, and methods commonly used for photocuring reactions may be used.

The photocurable resin composition of the present invention may be used in any application. It may be used in various technical fields, such as inks (e.g. printing inks such as photocurable lithographic inks, silk screen inks, and gravure inks), coating materials (e.g. coating materials for paper, plastics, metals, wood, or other substrates, such as overprint varnishes), adhesives, and photoresists.

The ink of the present invention encompasses any ink that includes the photocurable resin composition of the present invention. The coating material of the present invention encompasses any coating material that includes the photocurable resin composition of the present invention. The coating material of the present invention is preferably an overprint varnish.

For example, the ink may typically be prepared as follows. An allylic polymer (A), a gelling agent (B), and additives such as a stabilizer are dissolved in an ethylenically unsaturated compound (C) with stirring at 60° C. to 120° C. to prepare a varnish. The varnish is combined with a pigment, a photopolymerization initiator, and other additives with stirring in a butterfly mixer, followed by milling using, for example, a three-roll mill to obtain an ink.

An overprint varnish may be prepared in the same manner as described for the ink but using no pigment.

EXAMPLES

The present invention is described in greater detail below referring to, but not limited to, examples.

Measurement of Weight Average Molecular Weight (Mw) and Molecular Weight Distribution (Mw/Mn) of Allylic Polymer Weight average molecular weight (Mw) and molecular weight distribution (Mw/Mn) were measured by GPC. The weight average molecular weights are relative to polystyrene standards.
Column: Shodex KF-806L, KF-804, KF-803, KF-802, and KF-801 connected in series
Flow rate: 1.0 mL/min
Temperature: 40° C.
Detection: RID-6A
Sample: measurement samples were each prepared by dissolving 20 mg of a sample in 10 mL of tetrahydrofuran.

Production Example 1: Synthesis of Polymer of Diallyl 1,2-Cyclohexanedicarboxylate Diallyl 1,2-cyclohexanedicarboxylate was produced by an esterification reaction between cyclohexanedicarboxylic anhydride and allyl alcohol.

To a 3 L separable flask were added 2,400 g of diallyl 1,2-cyclohexanedicarboxylate and 60 g of benzoyl peroxide, followed by stirring with heat at 80° C. After 2.5 hours of reaction, the reaction mixture was cooled to 30° C. After the cooling, methanol was added to the flask to precipitate a polymer. The polymer was dried under reduced pressure at 40° C. for 16 hours to obtain Polymer 1 (amount produced: 408 g, yield: 17%, Mw=32,000, Mw/Mn=2.8)

Examples 1 and 2

(1) Preparation of Varnish
35 parts by weight of the resin (Polymer 1 above), 65 parts by weight of DTMPTA (SR-355NS: ditrimethylolpropane tetraacrylate available from Sartomer), and 0.3 parts by weight of a polymerization inhibitor (IRGANOX 1076: octadecyl-3-(3,5-di-t-butyl-4-hydroxyphenyl)propionate available from BASF Japan) were charged and dissolved with heat at 100° C. to prepare a slightly pale yellow, transparent varnish.
(2) Preparation of Gel Varnish
To 100 parts by weight of the varnish prepared in (1), 0.6 parts by weight of a gelling agent for Example 1 (ALCH: aluminum-di-iso-propoxide-ethylacetoacetate (aluminum complex compound) available from Kawaken Fine Chemicals Co., Ltd.) or 1.0 part by weight of a gelling agent for Example 2 (Orgatix ZC-150: zirconium tetraacetylacetonate (organozirconium) available from Matsumoto Fine Chemical Co., Ltd.) was added, followed by stirring at 110° C. for 1 hour to prepare transparent gel varnishes.
(3) Preparation of Ink
Method for Preparing Photocurable Ink
62.6 parts by weight of each of the gel varnishes prepared in the above (2), 10.4 parts by weight of ditrimethylolpropane tetraacrylate (DTMPTA), 2 parts by weight of a polyethylene wax, 5 parts by weight of a photopolymerization initiator (Irgacure 907: 2-methyl-1-[4-(methylthio)phenyl]-2-morpholinopropan-1-one available from BASF Japan), and 20 parts by weight of a pigment (phthalocyanine blue) were milled with a three-roll mill to prepare inks.

Comparative Example 1

An ink was prepared in the same manner as in Examples 1 and 2, except for using the varnish prepared in (1) in place of the gel varnishes (the gel varnishes prepared in the above (2)).

(Dynamic Viscoelastic Measurements)

The inks prepared in Examples 1 and 2 and Comparative Example 1 were subjected to dynamic viscoelastic tests to measure the storage modulus. In the tests "after emulsification" for the case where water was mingled, 100 parts by weight of water was added to 100 parts by weight of the ink, followed by stirring and mixing for 3 minutes using a disperser to prepare an emulsified ink, which was then subjected to viscoelastic tests.

(Conditions of Dynamic Viscoelastic Measurements)

Frequency sweep measurements were carried out at 25° C. using a HAAKE MARS III viscoelastic measuring apparatus (Thermo Fisher Scientific) with a cone plate of 35 mm in diameter at a cone angle of 2°.

The measured storage moduli are expressed as an index, with Comparative Example 1 set equal to 100, and the evaluation results are shown in Table 1. A higher index indicates a higher storage modulus.

(Measurement of Viscosity)

The prepared gel varnishes and varnish were measured for viscosity (Pas) at 25° C. using a BROOKFIELD VISCOMETER DV-II+Pro. The evaluation results are shown in Table 1.

TABLE 1

|  | Example 1 | Example 2 | Comparative Example 1 |
|---|---|---|---|
| Gelling agent | ALCH 0.6 parts | ZC-150 1.0 part | — |
| Viscosity (Pa · s at 25° C.) of gel varnish or varnish | 480 | 186 | 129 |
| Appearance of gel varnish or varnish | Colorless, transparent | Pale yellow, transparent | Slightly pale yellow, transparent |
| Storage modulus of ink before emulsification (at low frequency range of 0.01 Hz) | 29% | 22% | 100% |
| Storage modulus of ink after emulsification (at low frequency range of 0.01 Hz) | 65% | 64% | 100% |
| Storage modulus of ink before emulsification (at high frequency range of 10 Hz) | 163% | 92% | 100% |
| Storage modulus of ink after emulsification (at high frequency range of 10 Hz) | 158% | 107% | 100% |

As shown in Table 1, the composition of Example 1 (which contained (A) an allylic polymer produced by polymerization of an allylic compound having a specific structure, and (B) a gelling agent), both in the absence of water (before emulsification) and in the presence of water (after emulsification), had a lower storage modulus at the low frequency range and thus good fluidity, and further exhibited a higher storage modulus at the high frequency range and thus improved response speed in high-speed printing and good printing responsiveness. Moreover, the composition of Example 2, both in the absence of water (before emulsification) and in the presence of water (after emulsification), had a lower storage modulus at the low frequency range and thus good fluidity. These results demonstrated that the combined use of an allylic polymer (A) and a gelling agent (B) provided good fluidity and/or printing responsiveness, and therefore the resulting compositions had high printability and were suitable as inks.

Moreover, the addition of the gelling agent raised the viscosity of the varnish and increased the storage modulus at the high frequency range. This indicates that the incorporation of the allylic polymer (A) together with the gelling agent (B) resulted in formation of pseudo-crosslinks. Further, it was demonstrated that since the appearance of the gel varnish of Example 1 was colorless and transparent, and the appearance of the gel varnish of Example 2 was pale yellow and transparent, these gel varnishes can be suitably used in inks (e.g. offset inks), coating materials, adhesives, photoresists, and other similar applications.

INDUSTRIAL APPLICABILITY

The photocurable resin composition of the present invention may be used in inks (e.g. offset inks), coating materials, adhesives, photoresists, and other similar applications, especially for plastic substrates.

The invention claimed is:

1. A photocurable resin composition, comprising (A) an allylic polymer and (B) a gelling agent, the allylic polymer (A) being produced by polymerization of an allylic compound represented by the following formula (I):

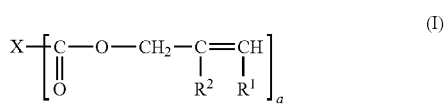

wherein $R^1$ and $R^2$ each represent H or $CH_3$; X represents an a-valent group having an unsubstituted saturated or partially unsaturated four- to eight-membered cyclic structure; and a represents 2, and the X in formula (I) has a cyclic structure selected from the group consisting of:

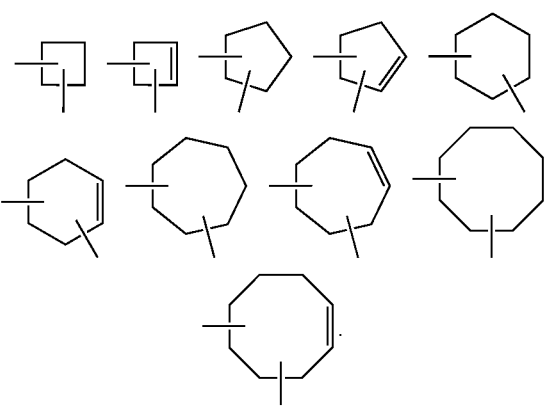

2. The photocurable resin composition according to claim 1, further comprising (C) an ethylenically unsaturated compound.

3. The photocurable resin composition according to claim 1, further comprising a photopolymerization initiator.

4. An ink, comprising the photocurable resin composition according to claim 1.

5. A coating material, comprising the photocurable resin composition according to claim 1.

6. The coating material according to claim 5, which is an overprint varnish.

7. The photocurable resin composition according to claim 1, wherein the gelling agent further comprises at least one selected from the group consisting of an aluminum complex compound, an organotitanate, and an organozirconium.

* * * * *